United States Patent [19]

Wilson et al.

[11] Patent Number: 5,024,574
[45] Date of Patent: Jun. 18, 1991

[54] RANDOM FUEL PELLET VACUUM TRANSFER APPARATUS

[75] Inventors: John F. Wilson; Enrique R. Rosal, both of Columbia, S.C.; George D. Bucher, North East, Md.

[73] Assignee: Westinghouse Electric Corp., Pittsburgh, Pa.

[21] Appl. No.: 373,074

[22] Filed: Jun. 29, 1989

[51] Int. Cl.$^5$ .............................................. B65B 21/02
[52] U.S. Cl. .................................................... 414/416
[58] Field of Search ............... 414/416, 627, 752, 737, 414/793, 417; 901/40; 294/64.1

[56] References Cited

U.S. PATENT DOCUMENTS

| | | | |
|---|---|---|---|
| 4,009,785 | 3/1977 | Trayes | 414/752 X |
| 4,049,484 | 9/1977 | Priest et al. | 156/28 S |
| 4,389,064 | 6/1983 | Lavekriake | 294/64 R |
| 4,452,557 | 6/1984 | Boawknigt et al. | 414/118 |
| 4,674,785 | 6/1987 | Riesenberg | 294/64.1 X |
| 4,699,370 | 10/1987 | Hashimoto et al. | 414/752 X |
| 4,712,784 | 12/1987 | Carroll | 271/100 |
| 4,778,326 | 10/1988 | Althouse et al. | 414/417 X |

Primary Examiner—Joseph E. Valenza
Assistant Examiner—Keith L. Dixon

[57] ABSTRACT

A vacuum transfer apparatus for use in en masse vacuum gripping nuclear fuel pellets includes an enclosure defining a vacuum chamber and having an open bottom, a rigid support gridwork spanning and attached to the enclosure open bottom, and a perforated mat attached to the gridwork along a side opposite from the enclosure. The mat is composed of resiliently flexible material and has a matrix of spaced apart holes of a cross-sectional size substantially smaller than the diameter of the pellets. The support gridwork defines a plurality of passages of a cross-sectional size substantially larger than that of the holes in the mat. The gridwork passages provide the sole path for communicating a vacuum from the enclosure chamber to the mat holes for vacuum gripping and holding the pellets at their upper end surfaces against the mat. A perforated tray is employed with the vacuum transfer apparatus for supporting the fuel pellets. The perforated tray has a plurality of openings of substantially the same size and spacing as the holes in the mat. Those of the openings not covered by thy pellets supported on the tray prevent formation of a vacuum between the mat and tray which could prevent lifting of the pellets from the tray.

9 Claims, 6 Drawing Sheets

RANDOM FUEL PELLET VACUUM TRANSFER APPARATUS

BACKGROUND OF THE INVENTION

1. Field of the Invention

The present invention relates generally to nuclear fuel pellet handling techniques and, more particularly, is concerned with an apparatus for vacuum transfer (gripping and lifting) of multiple fuel pellets standing on end in a random arrangement.

2. Description of the Prior Art

Arrays of nuclear fuel pellets in a green, or unsintered, state are typically loaded into rectangular containers, or boats, from stainless steel shelfs, or trays, in preparation for placing the fuel pellets in a sintering furnace. Heretofore, at a transfer station where the pellets are loaded from the trays into the boats, a vacuum transfer apparatus has been used. The vacuum transfer apparatus includes a overhead vacuum hood with an open bottom and a plate closing the hood bottom. The plate has an array of small openings with small vacuum cups attached thereto. Each vacuum cup is flexible, of conical shape, seated in one of the holes through the plate, and has a central bore therethrough for communicating a vacuum pulled in the interior of the hood with the surface of a given one pellet contacted by the vacuum cup.

The construction of the above-described prior art vacuum transfer apparatus has drawbacks in terms of the high degree of precision required in the placement of the fuel pellets to be gripped and lifted and the lack of versatility of the apparatus. For instance, each vacuum cup on the plate must rest precisely on the top of each pellet before the suction or vacuum is applied to ensure that a vacuum will be formed with the pellet end surface. The shallow concavity present in each end surface of the pellet further complicates the problem of effective application of the vacuum to the end surface. Because of the precision required in applying each vacuum cup to a pellet end surface, the vacuum cup size must match pellet diameter size, which can range from 0.38 to 0.42 inch. As a result, the plate on the hood must be changed for different pellet sizes, as the spacing between the pellets also varies according to diameter size.

These changes require considerable time. Also, an inventory of vacuum cup plates must be maintained. Further, because the array or pattern of the vacuum cups on the plate is fixed, the pellets must be precisely arrayed on the tray so as to match the fixed array of the vacuum cups.

Consequently, a need exists for a vacuum transfer apparatus construction which will avoid these drawbacks without introducing new ones in their place.

SUMMARY OF THE INVENTION

The present invention provides a random fuel pellet vacuum transfer apparatus designed to satisfy the aforementioned needs. The vacuum transfer apparatus of the present invention avoids the need for precision alignment of the fuel pellets in arrays or patterns which match that of the vacuum cups by eliminating the need to use the cups. High precision placement of pellets is no longer required; in contrast, pellets randomly arranged can now be vacuum gripped and lifted. Also, the components now used in place of the prior art vacuum cup plate are more versatile in that they need not be changed as the diameters of the fuel pellets being gripped and lifted are changed.

The vacuum transfer apparatus of the present invention employs a perforated upper mat, along with a rigid gridwork to back and support the mat, eliminating the need for the vacuum cups. No matter what the arrangement of fuel pellets forming a given layer on the tray, the vacuum transfer apparatus of the present invention will be able to pick up each pellet. The small spacing between the holes of the upper mat ensure that each pellet will be positioned beneath at least one hole of the upper mat. Also, pellets of slightly differing heights can be picked up together. As a result, perfect pellet positioning beneath the vacuum transfer apparatus is unnecessary. Time is saved by eliminating the need to make plate changes. Further, the provision of a perforated tray to support the pellets to be lifted prevents formation of a vacuum between the support tray and the perforated upper mat.

Accordingly, the present invention is directed to a vacuum transfer apparatus for use in vacuum gripping a plurality of pellets. The vacuum transfer apparatus comprises: (a) means defining a vacuum chamber in the form of an enclosure or overhead vacuum hood having an interior and an open bottom and a rigid support structure or gridwork spanning and attached to the open bottom of the hood; and (b) a perforated mat attached to the gridwork along a side thereof opposite from the hood. The perforated mat is composed of resiliently flexible material and has a matrix of spaced apart holes of a cross-sectional size substantially smaller than the diameter of the pellets. The gridwork has a plurality of passages of a cross-sectional size substantially larger than that of the holes in the mat for communicating a vacuum from the hood through the passages to the holes in the mat for vacuum gripping the pellets at end surfaces thereof against the mat.

In addition, a perforated pellet support tray is used in conjunction with the apparatus. The perforated support tray has a plurality of openings of substantially the same size and spacing as the mat holes. Those of the openings not covered by the pellets supported on the tray prevent formation of a vacuum between the mat and tray which could prevent lifting of the pellets from the tray.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

In the following description, like references characters designate like or corresponding parts throughout the several views. Also in the following description, it is to be understood that such terms as "forward", "rearward", "left", "right", "upwardly", "downwardly", and the like, are words of convenience and are not to be construed as limiting terms.

Prior Art Vacuum Transfer Apparatus

Figure 10:
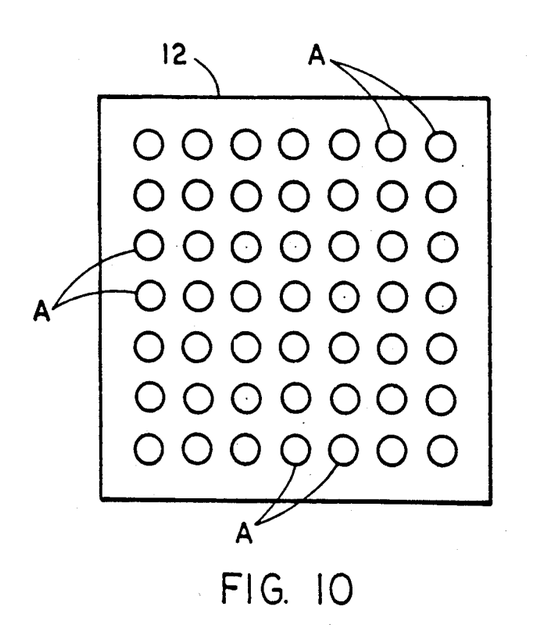
FIG. 10 is a top plan view of the array of pellets on the tray employed in the sequence of steps of FIGS. 1-7.
Figure 11:
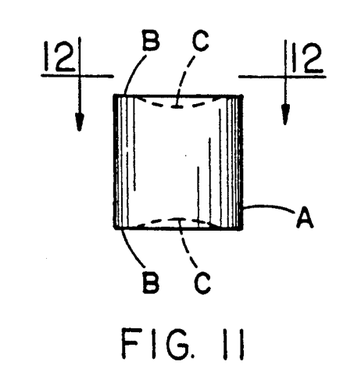
FIG. 11 is an enlarged side elevational view of a nuclear fuel pellet.
Figure 12:
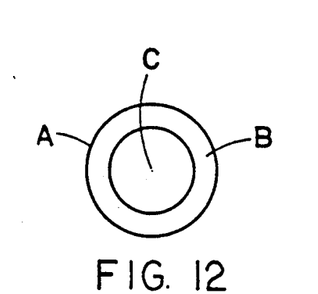
FIG. 12 is a top plan view of the pellet as seen along line 12—12 of FIG. 11.

Referring now to the drawings, and particularly to FIGS. 1-7, there is shown in schematical form a conventional transfer station, generally designated 10. At the transfer station 10, arrays of green nuclear fuel pellets A arrive on a succession of trays 12. The pellets A on each tray 12 (see also FIG. 10) are transferred en masse from the tray to a container or boat 14 which is then routed to a sintering furnace (not shown) for curing the pellet A. As seen in FIGS. 11 and 12, each pellet A is a right cylinder with a concavity C in each of its opposite end surfaces B.

Figure 13:
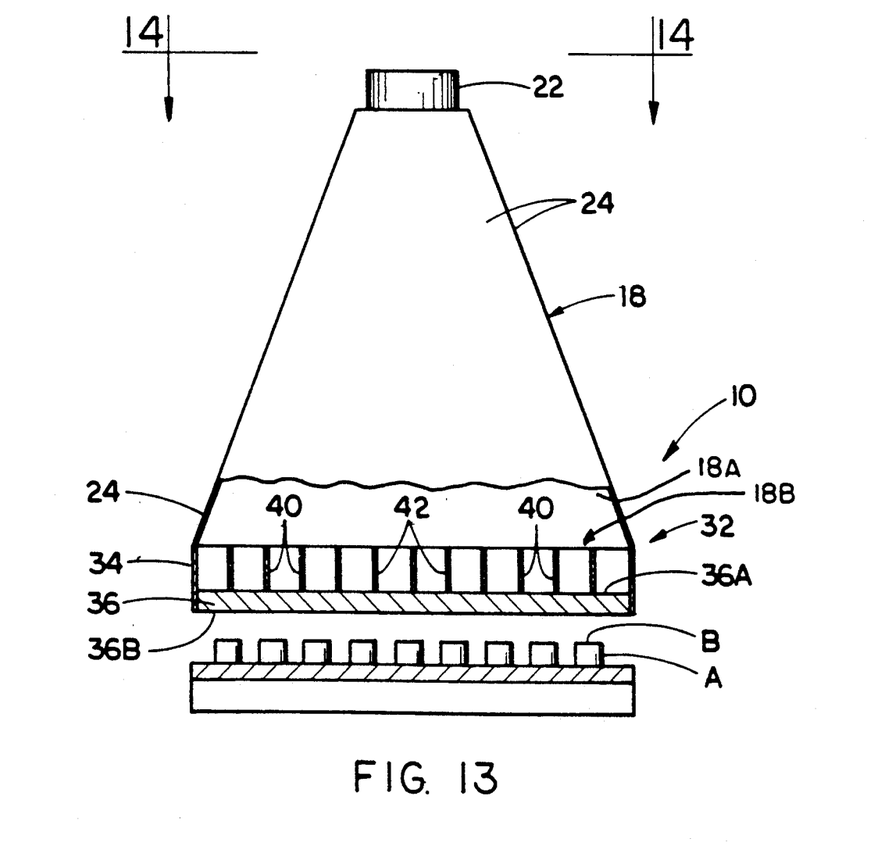
FIG. 13 is a side elevational view, partly in section, of a random fuel pellet vacuum transfer apparatus in accordance with the present invention.
Figure 14:
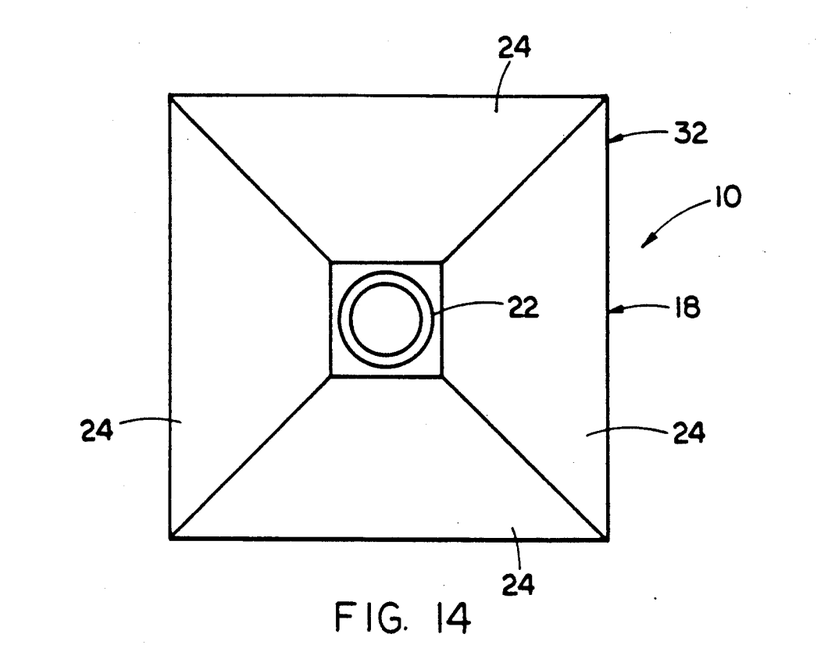
FIG. 14 is a top plan view of the apparatus as seen along line 14—14 of FIG. 13.

At the transfer station 10, a prior art vacuum transfer apparatus 16 is used to carry out the transfer en masse of the pellets of each tray to the boat 14. The vacuum transfer apparatus 16 includes an enclosure 18 in the form of an overhead hood defining an interior vacuum chamber 18A and having an open bottom 18B and a rigid plate 20 extending across and closing the hood bottom 18B. The hood 18 per se of the prior art vacuum transfer apparatus 16 has the same construction as shown in FIGS. 13 and 14. Particularly, the hood 18 has a top cylindrical portion 22 for attachment with a suitable vacuum-generating source (not shown) and a plurality (for example, four in number) of planar side portions 24 connected thereto which extend downwardly and outwardly in inclined fashion and are interconnected along their lateral edges so as to define the interior hood chamber 18 in a pyramidal configuration and the hood bottom 18B in a rectangular configuration.

Figure 8:
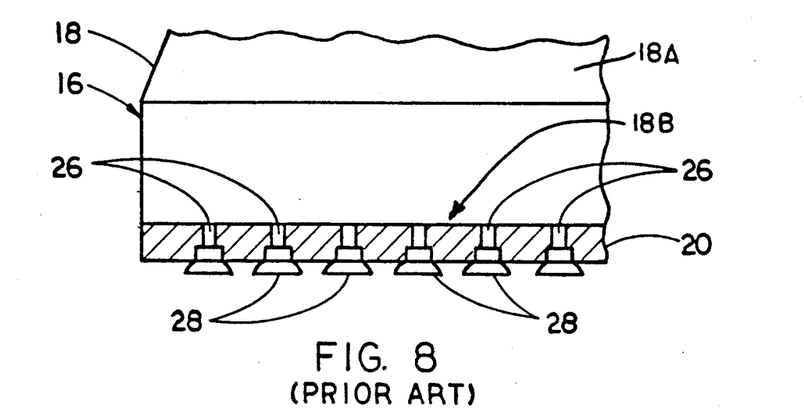
FIG. 8 is an enlarged fragmentary view of a plate with vacuum cups along the bottom of an overhead vacuum hood of the prior art vacuum transfer apparatus.
Figure 9:
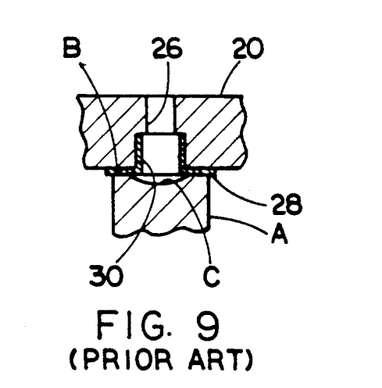
FIG. 9 is an enlarged view of a portion of the plate of FIG. 8, showing one of the vacuum cups gripping a nuclear fuel pellet.

The plate 20 of the vacuum transfer apparatus 16, preferably made of stainless steel and of a planar configuration, has an array of small openings 26 with small vacuum cups 28 attached thereto. Each vacuum cup 28 is flexible, of conical shape, and seated in one of the openings 26 through the plate 20. Also, as best seen in FIGS. 8 and 9, each vacuum cup 28 has a central bore 30 therethrough for communicating the vacuum in the interior chamber 18A of the hood 18 with the upper end surface B of the one pellet A contacted by the vacuum cup 28. Registry of the vacuum cup 28 with the end surface B of the pellet A must be made with precision, particularly in view of the presence of the concavity C (see also FIGS. 11 and 12) in the pellet end surface B.

Figure 1:
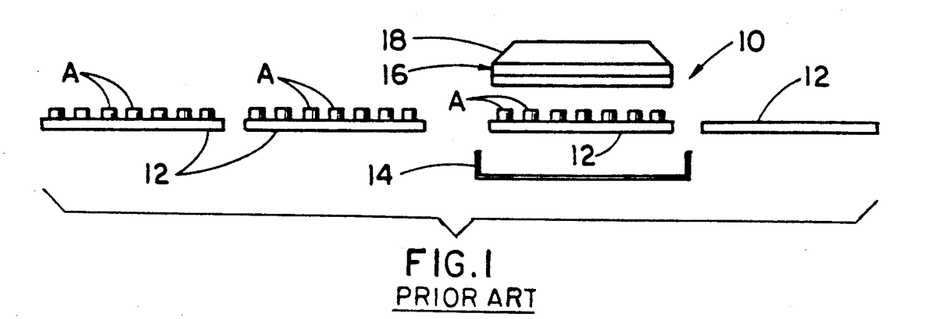
FIGS. 1-7 are schematical representations of a sequence of prior art steps performed in transferring pellets from a given tray into a furnace sintering boat.
Figure 2:
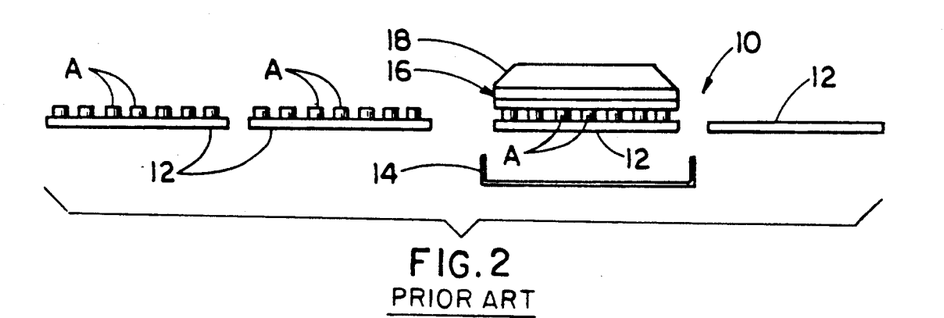

One cycle of the prior art pellet transfer operation at the transfer station 10 is schematically illustrated in FIGS. 1-7. FIG. 1 depicts arrival of one of the succession of pellet-loaded trays 12 into an unloading position at the station 10 between the overhead hood 18 and one boat Ia to be loaded which is positioned below the tray 12. FIG. 2 shows the hood 18 lowered to adjacent the upper ends of the pellets A from it initial elevated position so as to forcibly expand the vacuum cups 28 against the upper end surfaces B of the pellets. A vacuum is then communicated to the end surfaces B of the pellets A from the hood 18 via the openings 26 in the plate 20 and the bores 30 of the cups 28, as seen in FIG. 9.

Figure 3:
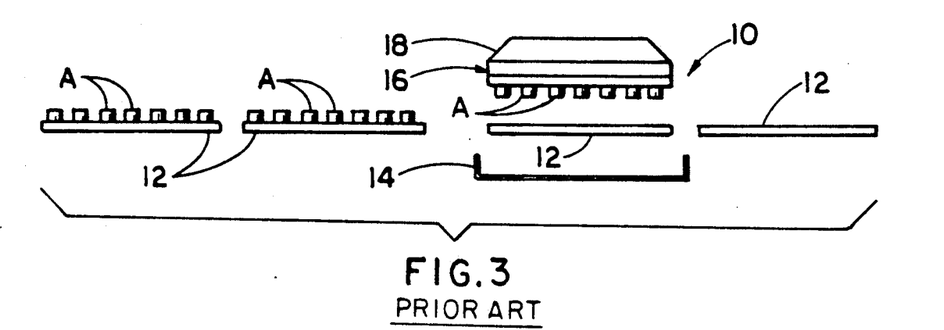
Figure 4:
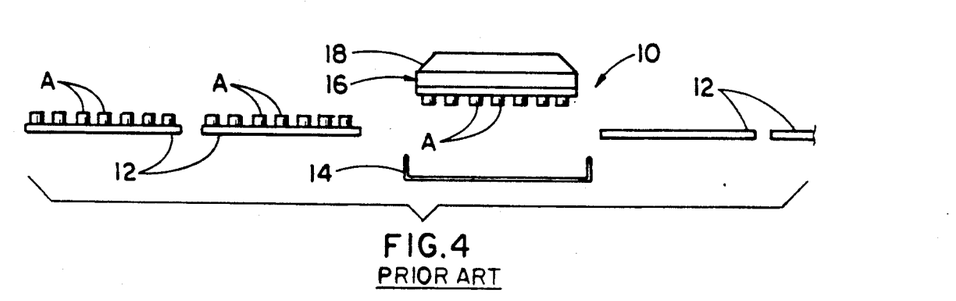
Figure 5:
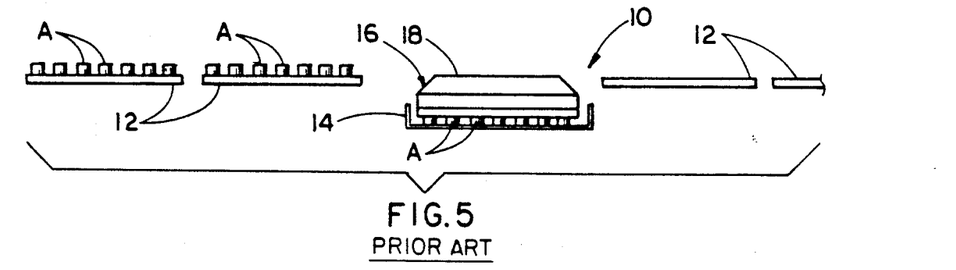
Figure 6:
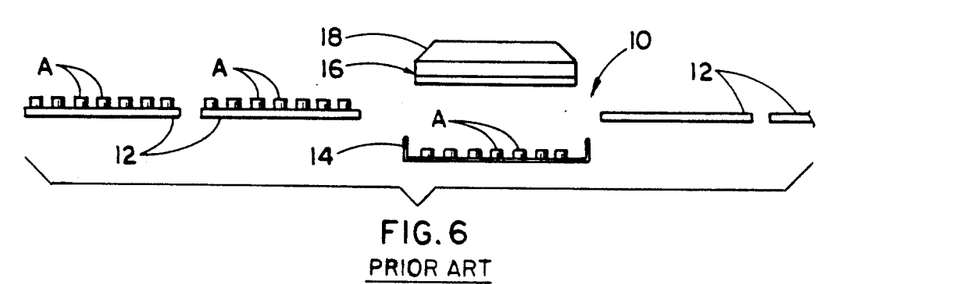
Figure 7:
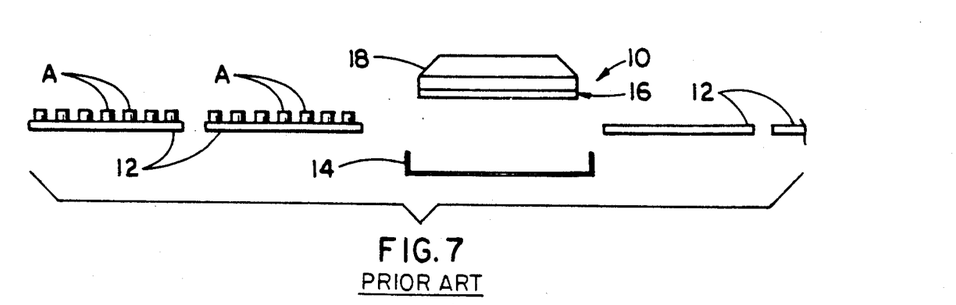

FIG. 3 shows the hood 18 raised back to it initial elevated position taking the pellets A en masse therewith from the one tray 12. As seen in FIG. 4, the empty tray 12 is then moved out of the station 10, after which the hood 18 is lowered to adjacent the empty boat 14, as shown in FIG. 5, placing the pellets A in the boat. The vacuum is then broken permitting the pellets A to remain in the boat as the hood 18 is raised again back to its initial elevated position, as shown in FIG. 6. Finally, the loaded boat 14 is removed and replaced with another empty one, as seen in FIG. 7, and the steps are repeated again with respect to the next successive loaded tray 12. In the schematic illustration, only one layer of pellets A are shown on the boat 14, however, in actual operation there are several layers of pellets loaded into a loaded boat.

Random Pellet Vacuum Transfer Apparatus of Present Invention

Referring now to FIGS. 13-18, there is illustrated a random pellet vacuum transfer apparatus, generally designated 32, constructed in accordance with the principles of the present invention, for vacuum gripping and lifting en masse the pellets A. The random pellet vacuum transfer apparatus 32 is employed in place of the prior art vacuum transfer apparatus 16 for carrying out the transfer of pellets A to the boat 14.

In its basic components, the vacuum transfer apparatus 32 of the present invention includes the enclosure of overhead vacuum hood 18 (with the same construction as in the prior art apparatus 16) having the vacuum chamber 18A and open bottom 18B, a rigid structure in the form of a fixture or gridwork 34 spanning and attached to the open bottom 18B of the vacuum hood 18, and a flat perforated mat 36 attached (such as by use of an adhesive) to the gridwork 34 along a side thereof opposite from the hood 18.

Preferably, the perforated mat 36 of the apparatus 32 is composed of resiliently flexible material, such as rubber, and has a matrix of spaced apart holes 38 of a cross-sectional, or diameter, size substantially smaller than the diameter of the typical nuclear fuel pellet A. The mat 36 has opposite upper and lower surfaces 36A, 36B, with the holes 38 (see FIG. 17) opening at the upper surface 36A in communication with the vacuum chamber 18A and opening at the lower surface 36B in communication with the pellet upper end surfaces B.

Figure 17:
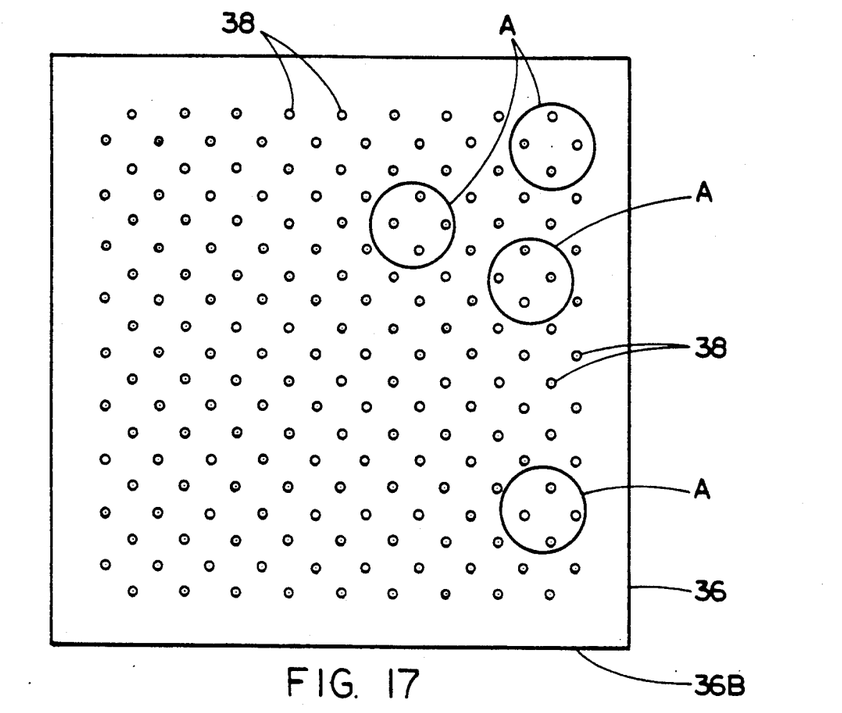
FIG. 17 is a plan view of a perforated mat of the apparatus of FIG. 13.

In one exemplary embodiment of the mat 36, the holes 38 have a diameter size of 0.037 inch and center-to-center spacings of 0.18 inch with the holes arranged in a checkerboard pattern. The size of the mat 36 is 11×11 inches and the hole pattern is 10.4×10.4 inches. Typical pellet sizes range from 0.38 to 0.42 inch.

As illustrated in FIG. 17, the small spacing between the holes 38 compared to the typical diameter sizes of the pellets ensures that each pellet will be positioned beneath at least one hole 38 of the perforated mat 34 disposed above the pellets. Consequently, perfect pellet positioning beneath the vacuum transfer apparatus 32 is unnecessary. Further, the flexible, compressive material of the mat 36 permits pellets of slightly differing heights to be vacuum gripped and lifted by the apparatus 32. Significant time is saved by not needing to change the mat 36 for accommodating pellets of different diameter and height sizes.

Figure 15:
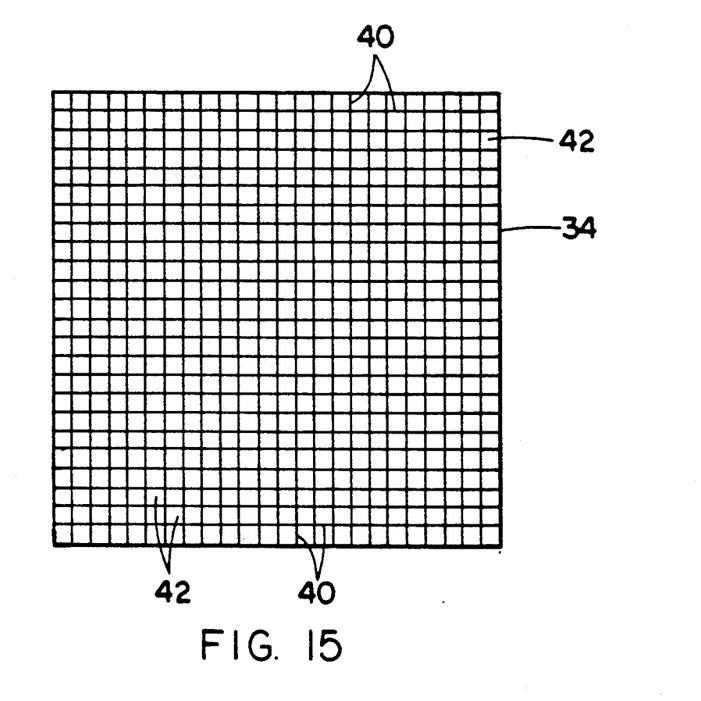
FIG. 15 is a plan view of a support gridwork of the apparatus of FIG. 13.
Figure 16:
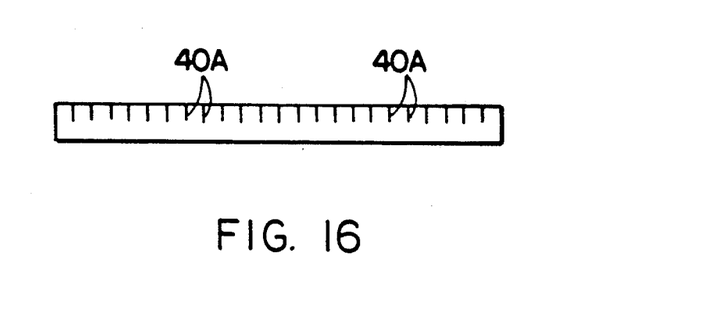
FIG. 16 is a side elevational view of one strip of the gridwork of FIG. 15.

The rigid fixture or gridwork 34 of the apparatus 32 serves to back the mat 36 so as to prevent the mat 36 from bowing upwardly due to the vacuum from the hood 18, while at the same time permitting communication of the vacuum from the overhead vacuum hood 18 to the mat 36. The gridwork 34, preferably of rectangular shape, is composed of a plurality of elongated thin strips 40, one of which is seen in FIG. 16. Each strip 40 has spaced slots 40A open along and extending perpendicular to one longitudinal edge. The slots 40A permit the strips to be assembled in interleaved, criss-cross fashion and rigidly attached together, such as by brazing, to define a plurality of passages 42 therethrough. The passageways 42 are permanently open at their opposite ends located at upper and lower sides of the gridwork 34 for providing constant open communication of the vacuum of the overhead hood 18 to the mat 36.

In one exemplary embodiment, the strips 40 are composed of Inconel 718 material of 0.0105 inch thickness. Each strip 40 is eleven inches in length and one inch in height. Each slot 40A in the strips 40 is 0.012–0.014 inch wide by 0.53 inch deep. Thus, the size, or area, of the gridwork 34 is approximately the same as that of the mat 36. The passages 42 have a square crosssectional shape and cross-sectional widths of 0.49 inch. Thus, the size, or cross-sectional area, of each gridwork passage 42 is substantially larger than of each mat hole 38. The gridwork passages 42 communicate the vacuum from the hood through the passages 42 to the holes 38 in the mat 36 for vacuum gripping and holding the pellets A at the upper end surfaces B thereof against the flexible mat 36. Also, in view that the thickness of each strip 40 (0.0105 inch) is less than the diameter (0.037 inch) of each mat hole 38, the strips 40 will not completely cover any hole 38 in the mat.

Figure 18:
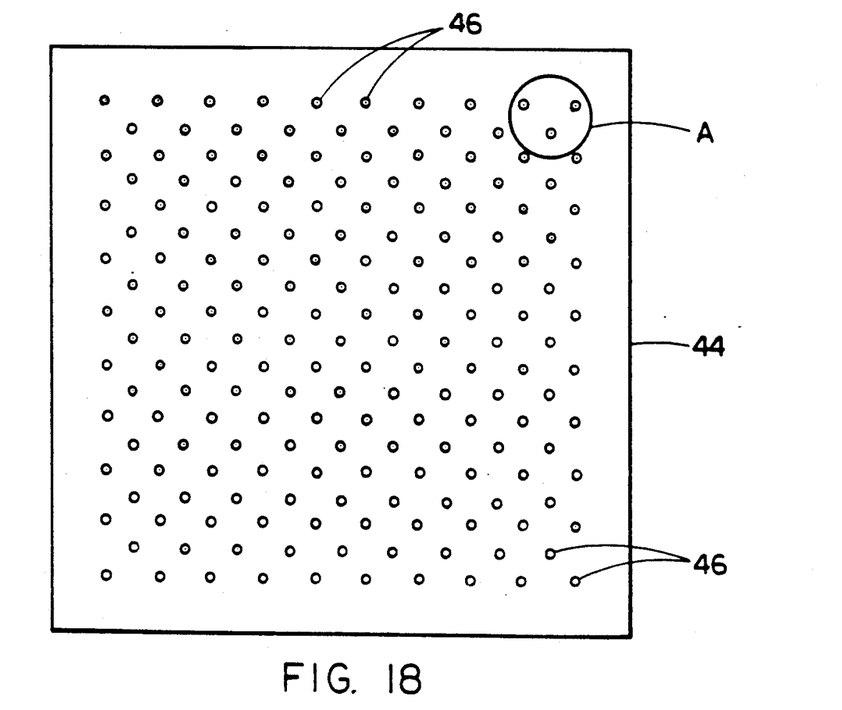
FIG. 18 is a plan view of a perforated tray of the apparatus of FIG. 13.

In addition, referring to FIG. 18, a perforated tray 44 is employed with the vacuum transfer apparatus 32 in place of the prior art imperforate tray 12 for supporting the plurality of fuel pellets A. The perforated pellet support tray 44 has a plurality of openings 46 of substantially the same size and spacing as the holes 38 in the mat 36. Those of the openings 46 not covered by pellets A supported on the tray 44 prevent formation of a vacuum between the mat 36 and tray 44 which could prevent lifting of the pellets from the tray 44. In an exemplary embodiment, the tray 44 is ⅛ inch thick and composed of a low friction material, such as Teflon composition, which permits the pellets to be slide thereon at an earlier pellet forming station (not shown).

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

We claim:

1. A vacuum transfer apparatus for use in en mass vacuum gripping nuclear fuel pellets, said apparatus comprising:
   (a) an enclosure defining a vacuum chamber and having an open bottom;
   (b) a rigid support structure spanning and attached to said open bottom of said enclosure; and
   (c) a perforated mat attached to said structure along a side thereof opposite from said hood enclosure, said mat being composed of resiliently flexible material and having a matrix of spaced apart holes of a cross-sectional size substantially smaller than the diameter of the pellets;
   (d) said support structure defining a plurality of passages of a cross-sectional size substantially larger than that of said holes in said mat and providing the sole path for communicating a vacuum from said chamber of said enclosure to said holes in said mat for vacuum gripping and holding the pellets at end surfaces thereof against said mat, said passages being permanently open at their opposite ends for providing constant open communication of the vacuum from said vacuum chamber to said perforated mat;
   (e) said support structure being composed of a crisscrossed arrangement of parallelly-disposed and spaced apart strips wherein the thickness of the surface of said strips which is in contact with said mat is less than the diameter of said holes in said mat such that said strips will not completely cover and thus block communication of a vacuum through any of said holes in said mat.

2. The apparatus as recited in claim 1, wherein said mat is composed of rubber.

3. The apparatus as recited in claim 1, wherein said spacing between said holes in said mat is smaller than the diameter of the pellets.

4. The apparatus as recited in claim 1, wherein said mat has opposite upper and lower surfaces, said holes opening at said upper surface in communication with said vacuum chamber and opening at said lower surface in communication with the pellets.

5. The apparatus as recited in claim 1, further comprising:
   a perforated tray for supporting the fuel pellets below said mat, said tray having a plurality of openings of substantially the same size and spacing as said holes inn said mat for preventing formation of a vacuum between said mat and tray which could prevent lifting of the pellets from said tray.

6. A vacuum transfer apparatus for use in en masse vacuum gripping nuclear fuel pellets, said apparatus comprising:
   (a) an overhead vacuum hood defining a vacuum chamber and having an open bottom;
   (b) a rigid support gridwork spanning and attached to said open bottom of said hood; and
   (c) a perforated mat attached to said gridwork along a side thereof opposite from said hood, said mat being composed of resiliently flexible material and having a matrix of spaced apart holes of a crosssectional size substantially smaller than the diameter of the pellets;

(d) said gridwork being composed of a criss-crossed arrangement of spaced apart strips defining a plurality of passages of a cross-sectional size substantially larger than that of said holes in said mat and providing the sole path for communicating a vacuum from said hood chamber to said holes in said mat for vacuum gripping and holding the pellets at end surfaces thereof against said mat, said passages being permanently open at their opposite ends for providing constant open communication of the vacuum from said vacuum chamber to said perforated mat, the thickness of the surface of said strips of said gridwork which is inn contact with said mat being less than the diameter of said holes in said mat such that said strips will not completely cover and thus block communication of a vacuum through any of said holes in said mat.

7. The apparatus as recited in claim 6, wherein said mat is composed of rubber.

8. The apparatus as recited in claim 6, wherein the spacing between said holes in said mat is smaller than the diameter of the pellets.

9. The apparatus as recited in claim 6, further comprising:

a perforated tray for supporting the fuel pellets below said mat, said tray having a plurality of openings of substantially the same size and spacing as said holes in said mat for preventing formation of a vacuum between said mat and tray which could prevent lifting of the pellets from said tray.

* * * * *